United States Patent
Guidetti

(10) Patent No.: US 8,499,811 B2
(45) Date of Patent: Aug. 6, 2013

(54) DEVICE FOR SUPPORTING COUNTER-ROTATING ELEMENTS

(75) Inventor: Dario Guidetti, Grignasco (IT)

(73) Assignee: Cavanna S.p.A., Prato Sesia (Novara) (IT)

( * ) Notice: Subject to any disclaimer, the term of this patent is extended or adjusted under 35 U.S.C. 154(b) by 360 days.

(21) Appl. No.: 12/937,921

(22) PCT Filed: Feb. 12, 2009

(86) PCT No.: PCT/IB2009/050582
§ 371 (c)(1),
(2), (4) Date: Oct. 14, 2010

(87) PCT Pub. No.: WO2009/127976
PCT Pub. Date: Oct. 22, 2009

(65) Prior Publication Data
US 2011/0030902 A1    Feb. 10, 2011

(30) Foreign Application Priority Data
Apr. 18, 2008 (EP) .................................. 08425267

(51) Int. Cl.
*B32B 37/00* (2006.01)
(52) U.S. Cl.
USPC ..................... 156/555; 156/580.2; 156/582
(58) Field of Classification Search
USPC .............. 156/555, 580, 580.1, 580.2, 582, 156/583.1; 264/442, 443, 444
See application file for complete search history.

(56) References Cited

U.S. PATENT DOCUMENTS

| 5,811,750 | A * | 9/1998 | Caprioglio ..................... 219/81 |
| 6,349,746 | B1 | 2/2002 | Bergemann et al. |
| 6,574,944 | B2 | 6/2003 | Capodieci |
| 2003/0111157 | A1 | 6/2003 | Ehlert et al. |
| 2007/0158012 | A1 | 7/2007 | Heil et al. |

FOREIGN PATENT DOCUMENTS

| EP | 0 705 657 A1 | 4/1996 |
| EP | 2 110 227 A1 | 10/2009 |
| IT | 1160245 B | 3/1987 |

OTHER PUBLICATIONS

Jun. 5, 2009 International Search Report in PCT Application No. PCT/IB2009/050582 (13 pages).

* cited by examiner

*Primary Examiner* — James Sells
(74) *Attorney, Agent, or Firm* — Popovich, Wiles & O'Connell, P.A.

(57) ABSTRACT

A support device 10 for counter-rotating elements 12, 14 susceptible of rotating in opposite directions around respective axes X12, X14 includes:—a first 22 and a second 24 support block for the counter-rotating elements 12, 14, and a connecting plate 26, extending bridge-like between the first 22 and the second 24 support block. The plate 26 is flexible to allow variation of the distance between the rotational axes X12, X14 of the counter-rotating elements 12, 14. An actuator 32 acting on the above-said support blocks 22 and 24 is provided to vary the distance between the rotational axes X12, X14 by means of the flexibility of the plate 26.

19 Claims, 3 Drawing Sheets

DEVICE FOR SUPPORTING COUNTER-ROTATING ELEMENTS

FIELD OF THE INVENTION

The present disclosure refers to support devices for counter-rotating elements.

The present disclosure has been developed with particular attention to its possible employment for the support of counter-rotating elements included in ultrasound welding systems.

DESCRIPTION OF THE RELATED ART

In numerous sectors of the art the need arises for supporting counter-rotating elements such as, for example, counter-rotating rollers, counter-rotating wheels, counter-rotating disks.

In particular, machines denominated "flow-pack" (at times also denominated "form-fill-seal" or, in short, ffs) for realising single or multiple wrappings formed starting from tape-like wrapping material are widely diffuse in the packaging sector. First the wrapping material is closed to form a tube, bringing into contact and welding together the opposite edges of the tape so to form a tubular blank into which the products are inserted. The tubular blank is then pressed in areas included between successive articles, where transversal sealing lines are formed which are then subjected to cutting so to separate the single confections from each other.

Known methods for realising the longitudinal sealing line or "fin" of the tubular wrapping blank include advancing the edges of the tape destined to form the above-said fin through one or more pairs of counter-rotating elements that realise the welding of the edges, typically by thermal welding. In such situation, the device supporting the counter-rotating elements has three functions:

- guaranteeing that the counter-rotating elements, although freely rotatable, are maintained with their respective rotational axes parallel to each other and exactly at a predetermined distance,
- allowing the opening or moving apart of the counter-rotating elements (for example, to insert the material to be treated into the interval or gap formed between them) and,
- regulating the pressure exerted together by the counter-rotating elements on the treated material advancing between them.

Such aims can be pursued by taking recourse to a wide range of solutions, providing for the respective supporting blocks may slide closer together or farther apart from each other on respective guides through the action of moving means of various nature (micrometric screws, fluid actuators, etc.). It is also known that the counter-rotating elements can constitute part of an ultrasound welding device (see, for example, documents IT-B-1 160 245 or U.S. Pat. No. 6,574,944).

OBJECT AND SUMMARY OF THE INVENTION

The inventors noted that, particularly in the previously-mentioned ultrasound welding applications, the degree of precision of the functioning provided by conventional support devices may be insufficient for providing an ultrasound welding that is completely satisfactory from the qualitative point of view, mainly concerning the possibility of maintaining the welding characteristics constant in time.

Therefore the need is felt for support devices for counter-rotating elements capable of overcoming such insufficiencies shown by the devices of known type.

The object of the present invention is to provide such a device.

According to the present invention such object is achieved by means of a device having the features specifically recalled in the claims that follow. The claims are an integral part of the technical disclosure provided herein relative to the invention.

BRIEF DESCRIPTION OF THE ANNEXED DRAWINGS

The invention will now be described, by way of non-limiting example only, with reference to the enclosed drawings, wherein.

DETAILED DESCRIPTION OF THE EXEMPLARY EMBODIMENTS

Figure 1:
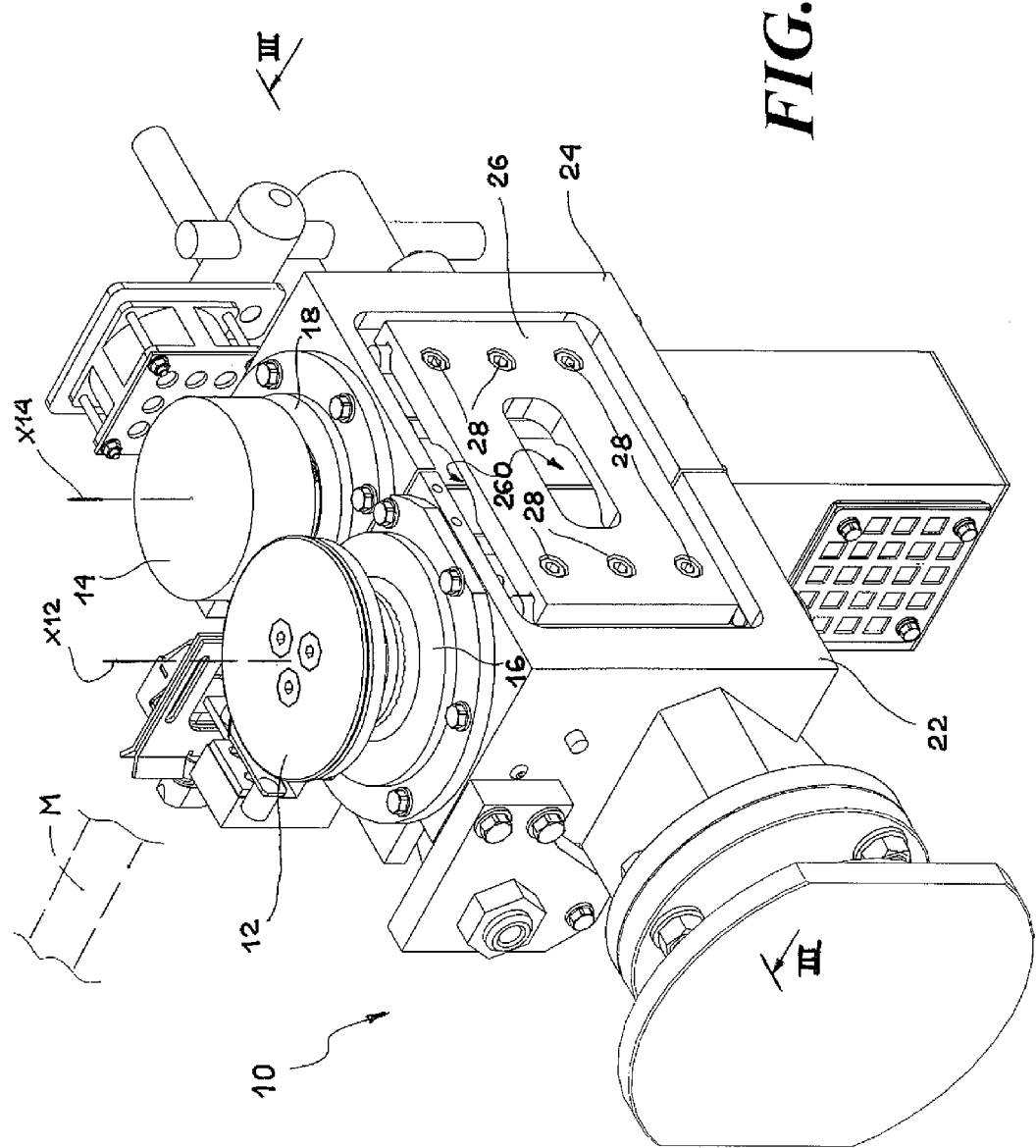
FIG. 1 is a general prospective view of a device of the type described herein.

In the following description, various specific details are illustrated to provide a thorough understanding of the embodiments. The embodiments can be practiced without one or more of the specific details, or with other methods, components, materials, etc. In other instances, known structures, materials or operations are not shown or described in detail to avoid obscuring the various aspects of the embodiments.

Reference throughout this specification to "one embodiment" or "an embodiment" means that a particular feature, structure or characteristic described in connection with the embodiment is included in at least one embodiment. Thus, the appearance of phrases such as "in one embodiment" or "in an embodiment", possibly present in various places throughout this specification do not necessarily refer to the same embodiment. Furthermore, the particular features, structures or characteristics may be combined in any suitable manner in one or more embodiments.

The headings provided herein are for convenience only and therefore do not interpret the field of protection or scope of the embodiments.

In the figures in the enclosed drawings, reference 10 indicates a support device in its entirety for two counter-rotating elements 12 and 14 rotatable (in opposite directions) around their respective axes X12 and X14, parallel to each other.

In one embodiment, the counter-rotating elements 12 and 14 are the anvil and ultrasonic welding horn, respectively, of an ultrasound welding system.

In one embodiment, this can be the system (or one of the systems) for ultrasound welding destined to form the so-called longitudinal fin of a wrapper of the type commonly denominated "flow-pack". The field of application of the device described herein, however, is not limited to application in this context.

In the embodiment illustrated herein, the counter-rotating elements 12 and 14 have an approximately disk shape and are mounted on respective shafts 120, 140. Two gear wheels 16 and 18 are splined onto the shafts 120, 140 in the proximity of the counter-rotating elements 12, 14. The gears 16 and 18 are coupled together forming a gear pair so that one of the shafts 120, 140 (for example the shaft 120), being pulled in rotation around its respective axis X12 by a motorisation not explicitly shown, pulls in rotation (in the opposite direction) the other shaft (for example, shaft 140) around its respective axis X14 causing the rotation of the elements 12 and 14 in opposite directions.

The solutions cited herein by way of example (motorised shaft 120 pulling shaft 140 by way of the gear pair 16, 18) can be applied in the case of an ultrasound welding system wherein the rotating element 12 and the rotating element 14 are the anvil and welding horn respectively. The fact that the shaft 140 is pulled in rotation by the shaft 120 by way of the gear pair 16, 18 facilitates the realisation of the complex constituted by the shaft 140 and by the rotating element 14 mounted on its extremity in the form of a horn for the application of the ultrasonic vibration to the welding zone identified by the cooperation point of the peripheries of the elements 12 and 14.

The elements 12 and 14 (or at least one of them, for example, the element 12) can be realised so to be replaceable in order to be able to modify the application pattern of the ultrasound front edge in the zone of cooperation between the counter-rotating elements 12 and 14.

References 22 and 24 indicate two solid support blocks receiving the shaft 120 and the shaft 140 respectively, mounted rotating inside. The precise mounting of the shafts inside the support blocks 22 and 24 is actuated through elements (from example bearings) of known type according to known machine construction criteria, which makes their detailed description herein superfluous. This is also valid concerning the transmission of the motion to the shaft 140 and/or the application of the wave front of ultrasonic excitation to the shaft 140 and to the rotating element 14 mounted on its extremity.

Reference 26 indicates a flat or substantially flat plate connected both to the support block 22 and to the support block 24 (which in the exemplary embodiment illustrated herein are assumed to be parallelepiped prismatic blocks with square or rectangular transverse sections) according to a general bridge-like arrangement.

In the illustrated embodiment plate 26 is fixed to the support blocks 22 and 24 through screws 28. Other fixing means known to one skilled in machine construction may be applied for such purpose. In the illustrated embodiment, cylinders 29 having a centring function are interposed between plate 26 and each of the support blocks 22 and 24. All of this so to insure that the bridge-like connection of plate 26 between the two blocks 22 and 24 is stable and precise, particularly concerning the parallel alignment of the axes X12 and X14 around which the counter-rotating elements 12 and 14 rotate.

The exemplary embodiment illustrated herein provides for the plate 26 disposed as a bridge-like connection between the support blocks 22 and 24 being unique, preferably with an open structure. Using more than one plate is naturally included within the scope of the present specification.

The plate or plates 26 (in the following, reference will be made to the presence of only one such plate for simplicity) is realised so to allow flexion in the region extending between the blocks 22 and 24.

Figure 3:
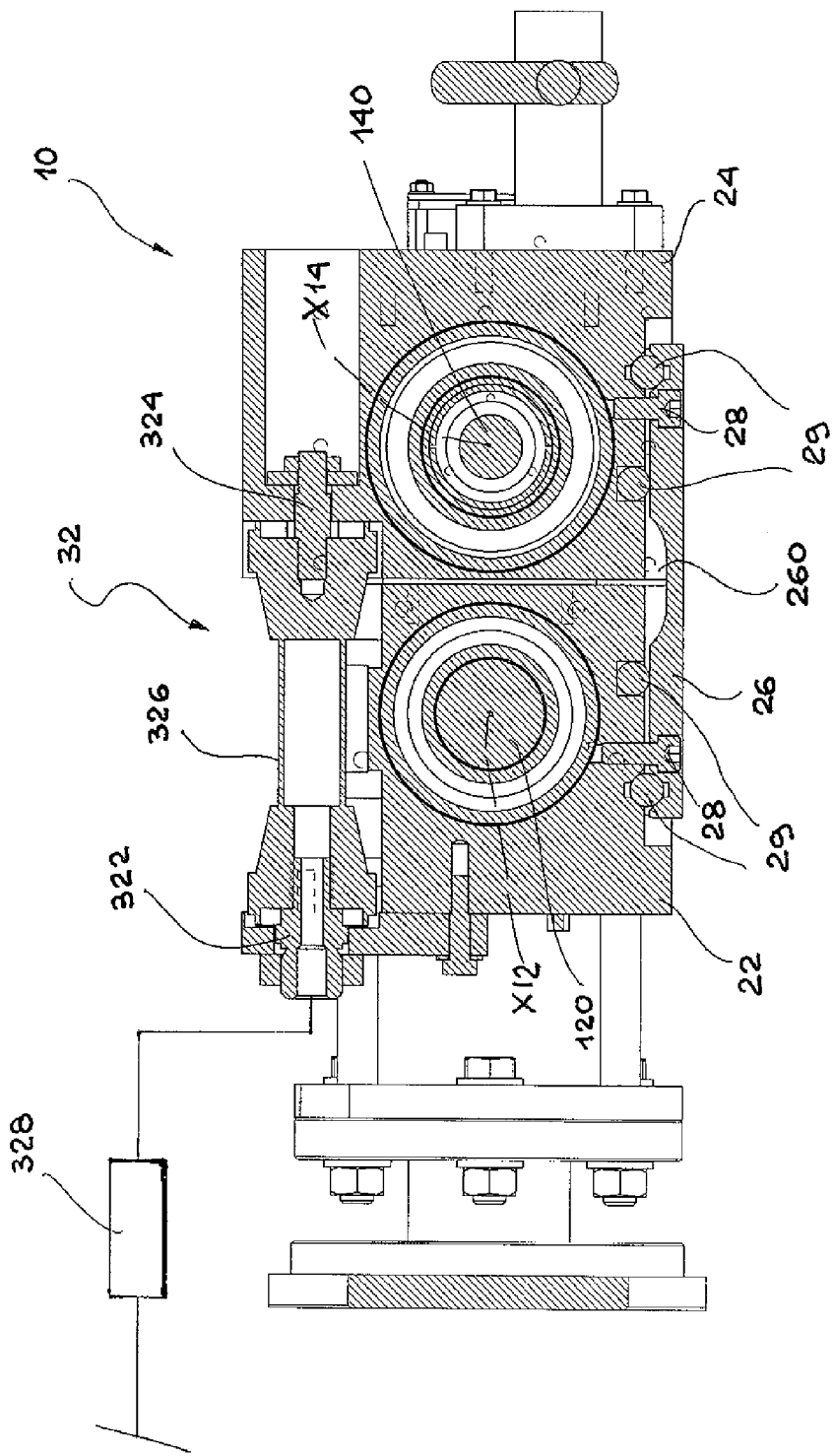
FIG. 3 is a section along the line III-III of FIG. 1.

In the exemplary embodiment illustrated herein (as can be best appreciated in the view in section in FIG. 3) such result is obtained by providing for the intermediate zone between blocks 22 and 24 the plate 26 to have an intermediate portion 260 that is thinner (that is, a so-called zone of lightening) obtained, for example, by forming a grinding relief in the plate, allowing plate 26 to bend with respect to the plane in which it generally lies.

Figure 2:
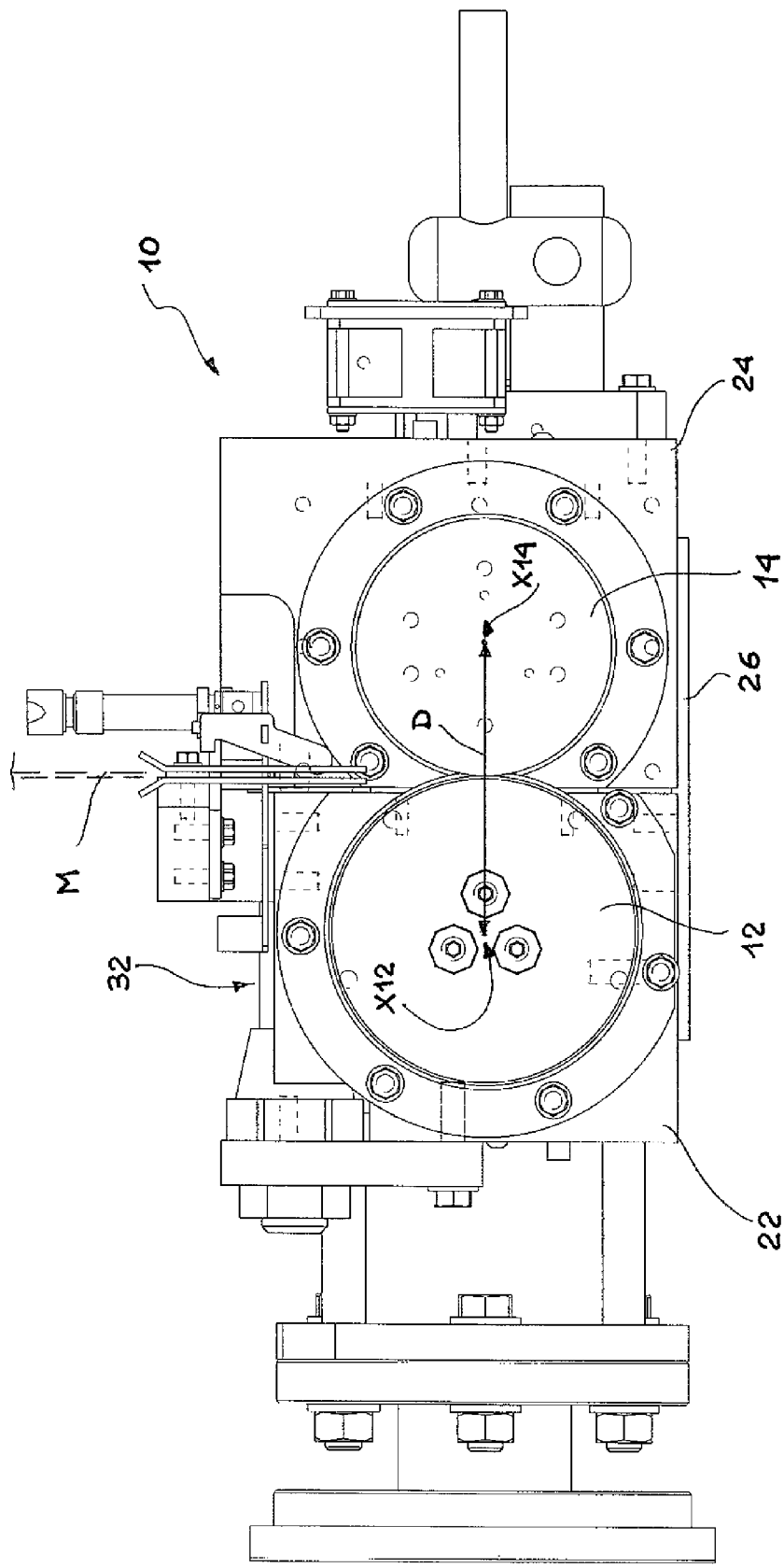
FIG. 2 is an extremity view of the device described herein.

The result achievable by means of the bending of plate 26 is that, though preserving their desired position of strict parallelism, the distance D between axes X12 and X14 (and consequently the counter-rotating elements 12 and 14) can be slightly modified, best observed in the front view in FIG. 2.

Indicatively, considering a distance D between the axes X12 and X14 in the order of 96 mm, the bending of plate 26 can allow for a variation of the distance D between the two axes X12 and X14 in the order of 2 mm. Naturally, such quantitative data are for orientative purposes only and should not be interpreted as limiting the scope of the specification.

The flexibility of plate 26 can be exploited to allow selective distancing of the peripheries of the counter-rotating elements 12 and 14 for the insertion into the interval or gap defined between them of a laminar structure M to be subjected to welding. This could be, for example, the two opposite edges of a tape of sheet material subjected to ultrasound welding for the formation of a tubular "flow-pack" wrapping blank.

In the exemplary embodiment illustrated herein it is supposed that the geometry of the blocks 22 and 24 and that of the plate 26 is such that at rest—that is, in the absence of external solicitations—a gap is present between the peripheries of the counter-rotating elements 12 and 14, for example in the order of 2 mm.

Such gap can then be annulled by acting on the blocks 22 and 24 (which are connected by plate 26 according to a general elastically re-closable jaw-like configuration) so to bring them together until the gap between the peripheries of the counter-rotating elements 12 and 14 is annulled.

Such result can be obtained through actuating elements of various natures. In the example of embodiment illustrated herein, such result is obtained by connecting the support blocks 22 and 24 through a fluid actuator 32.

In the exemplary embodiment illustrated herein, wherein the plate 26 and the actuator 32 are arranged on opposite sides with respect to the plane passing through the rotational axes X12 and X14, the actuator 32 includes:

two terminal parts of extremities 322 and 324 fixed to the block 22 and to the block 24 respectively, and an expandable element 326 susceptible of being fed with a fluid under pressure through a feeding line including, for example, a proportional valve 328.

The functioning of the actuator 32 provides for the expansion of chamber 326, contracting axially, when fed with the pressurised fluid and therefore generating an axial force that tends to bring the terminal parts of extremities 322 and 324 (and therefore the blocks 22 and 24) together with a force, the intensity of which can be regulated by acting on the proportional valve 328. An actuator of the type described is known, for example, from U.S. Pat. No. 6,349,746.

Starting from the previously-mentioned resting position (plate 26 not deformed and peripheries of the counter-rotating elements 12 and 14 maintained at a distance in the order of 2 mm) the feeding pressure of the actuator 32 can initially be brought up to a first threshold value of, for example, 3 atmospheres so to bring the peripheries of the counter-rotating elements 12 and 14 into contact with each other (virtually annulling the gap between such peripheries).

The possible further increase of the feeding pressure of the actuator 32 translates into an increase of the force pushing the peripheries of the counter-rotating elements 12 and 14 against each other (typically with the interposition of the material M interposed between them, for example to be subjected to ultrasound welding).

The solution described has the advantage of neither requiring the employment of guides or cams to regulate the relative positions of the blocks 22 and 24 and/or the relative moving together/apart of the same, nor the employment of actuator elements including a movable stem in a casing (of the jack type, for clarity), susceptible of originating friction phenomena not immediately foreseeable and such to modify in an undesirable and unpredictable way the cooperation conditions of the counter-rotating elements 12 and 14, under constant actuating action of the actuator 32.

Naturally, keeping the underlying principle of the invention constant, the details of realisation and the embodiments may vary, even appreciably, with respect to what has been illustrated by way of non-limiting example only, without departing from the scope of the invention, as defined by the annexed claims.

The invention claimed is:

1. A support device for first and second counter-rotating elements rotatable around first and second respective rotation axes, the device comprising:
    a first support block for supporting said first counter-rotating element and a second support block for supporting said second counter-rotating element,
    at least one connecting plate extending bridge-like between said first and second support blocks, said at least one plate being flexible and being configured such that a distance between said rotation axes of said counter-rotating elements is variable depending on an amount of flexion of said at least one plate, said first and second support blocks being connected by said at least one connecting plate in an elastically re-closable jaw-like configuration, and
    an actuator configured to act on said first and second support blocks to vary the distance between said rotation axes by flexing said at least one plate.

2. A device according to claim 1, wherein said at least one plate and said actuator are arranged on opposite sides with respect to a plane passing through said rotation axes.

3. A device according to claim 1, wherein said actuator is a fluid actuator.

4. A device according to claim 3, wherein said actuator includes an inflatable chamber which, when fed with fluid under pressure, expands radially and contracts axially.

5. A device according to claim 1, wherein said at least one plate has a flexible portion of reduced cross-section in a position interposed between said first and second support blocks.

6. A device according to claim 1, wherein said at least one plate is fixed to said first and second support blocks by screws.

7. A device according to claim 1, wherein centring bodies are interposed between said at least one plate and said first and second support blocks.

8. A device according to claim 1, wherein, with said at least one plate in an un-deformed state, said counter-rotating elements are spaced apart.

9. A device according to claim 8, further comprising a regulating device configured to apply to said actuator an actuating intensity level which produces a bending of said at least one plate to bring said counter-rotating elements into contact.

10. A device according to claim 8, further comprising a regulating device configured to apply to said actuator a selectable actuating intensity level sufficient to move said counter-rotating elements against each other with a selectable force.

11. A device according to claim 1, further comprising gears configured to pair said counter-rotating elements together.

12. A device according to claim 11, wherein one of said counter-rotating elements is rotated by a motor and the other of said counter-rotating elements is rotated by means of said gear pairing.

13. A device according to claim 1, wherein said counter-rotating elements are the anvil and ultrasonic horn of an ultrasound welding system.

14. A device according to claim 2, wherein, with said at least one plate in an un-deformed state, said counter-rotating elements are spaced apart.

15. A device according to claim 14, further comprising a regulating device configured to apply to said actuator an actuating intensity level which produces a bending of said at least one plate to bring said counter-rotating elements into contact.

16. A device according to claim 14, further comprising a regulating device configured to apply to said actuator a selectable actuating intensity level sufficient to move said counter-rotating elements against each other with a selectable force.

17. A device according to claim 4, wherein, with said at least one plate in an un-deformed state, said counter-rotating elements are spaced apart.

18. A device according to claim 17, further comprising a regulating device configured to apply to said actuator an actuating intensity level which produces a bending of said at least one plate to bring said counter-rotating elements into contact.

19. A device according to claim 18, further comprising a regulating device configured to apply to said actuator a selectable actuating intensity level sufficient to move said counter-rotating elements against each other with a selectable force.

* * * * *